United States Patent
Ogawa et al.

(10) Patent No.: US 8,062,485 B2
(45) Date of Patent: Nov. 22, 2011

(54) WATER TREATMENT DEVICE

(75) Inventors: Yui Ogawa, Gunma (JP); Hana Oe, Gunma (JP); Hiroyuki Umezawa, Gunma (JP)

(73) Assignee: Sanyo Electric Co., Ltd., Osaka (JP)

(*) Notice: Subject to any disclaimer, the term of this patent is extended or adjusted under 35 U.S.C. 154(b) by 820 days.

(21) Appl. No.: 12/153,029

(22) Filed: May 13, 2008

(65) Prior Publication Data

US 2008/0283391 A1 Nov. 20, 2008

(30) Foreign Application Priority Data

May 14, 2007 (JP) .................. 2007-128001
Dec. 21, 2007 (JP) .................. 2007-330658

(51) Int. Cl.
*C25B 9/00* (2006.01)
*C02F 1/461* (2006.01)

(52) U.S. Cl. .............. 204/269; 204/275.1; 204/276

(58) Field of Classification Search .............. 204/269, 204/275.1, 276
See application file for complete search history.

(56) References Cited

U.S. PATENT DOCUMENTS

| | | | |
|---|---|---|---|
| 3,915,822 A | 10/1975 | Veltman | |
| 3,919,062 A | 11/1975 | Lundquist, Jr. et al. | |
| 4,208,258 A | 6/1980 | Balko et al. | |
| 4,445,990 A | 5/1984 | Kim et al. | |
| 5,376,279 A | 12/1994 | Judd et al. | |
| 5,770,037 A * | 6/1998 | Goto et al. | 205/701 |
| 2006/0076297 A1 | 4/2006 | Akahori et al. | |

FOREIGN PATENT DOCUMENTS

| | | |
|---|---|---|
| EP | 0 259 000 A1 | 3/1988 |
| JP | 2005-254118 | 9/2005 |
| KR | 10-0716206 | 5/2007 |
| WO | WO 2008/078945 A1 | 7/2008 |

OTHER PUBLICATIONS

European Search Report issued in Patent Application No. 08008756.2-2104 dated on Sep. 4, 2008.

* cited by examiner

*Primary Examiner* — Arun S Phasge
(74) *Attorney, Agent, or Firm* — McDermott Will & Emery LLP

(57) ABSTRACT

There is disclosed a water treatment device capable of improving the treatment efficiency of for-treatment water and passing the for-treatment water once to sufficiently treat the water without repeatedly circulating the water, and the water treatment device includes a water passing first electrode arranged in the channel of the for-treatment water, a conductive fiber positioned on the downstream side of this first electrode and energized by the first electrode, a water passing second electrode positioned on the downstream side of this conductive fiber and forming a pair with the first electrode, an insulating porous spacer interposed between this second electrode and the conductive fiber, and a supply section which supplies voltages to both of the electrodes.

6 Claims, 6 Drawing Sheets

INFLUENCE OF DENSITY ON TREATMENT RATIO OF ESCHERICHIA COLI

INFLUENCE OF APPLIED CURRENT (DENSITY OF 0.16, COUNTER ELECTRODE AREA RATIO OF 3.4)

TOTAL AMOUNT OF CHLORINE TO BE GENERATED
(+/CF: DENSITY OF 0.16, COUNTER ELECTRODE AREA RATIO OF 3.4)
(+/PtIr: WITHOUT CF)

WATER TREATMENT DEVICE

BACKGROUND OF THE INVENTION

The present invention relates to a germ removal or sterilization treatment of microorganisms such as viruses included in rivers, water for beverage use or water (such water to be treated will hereinafter be referred to as the for-treatment water) for use in a pool, public bath, hot spring or the like, and it also relates to a water treatment device for removing a scale.

In recent years, a water treatment technology for removing microorganisms such as bacteria, mold and protozoa included in rivers, water for beverage use, or water (for-treatment water) for use in public bath, hot spring or the like has rapidly developed.

As one of such water treatment devices, the applicant has previously developed a device including a pair of electrodes and a conductor capable of trapping the microorganisms in the channel of the for-treatment water, whereby a positive charge is applied to this conductor, and a negative charge is applied to the electrodes, to allow the conductor to adsorb the microorganisms (e.g., see Patent Document 1: Japanese Patent Application Laid-Open No. 2005-254118).

The water treatment device of the above patent document can treat the microorganisms in the for-treatment water without using any reagent such as chlorine or ozone, which produces effects that the generation of odor peculiar to chlorine or ozone can be avoided and that an intricate operation for introducing the reagent and danger during handling can be avoided.

However, in the above water treatment device, the microorganisms can be adsorbed and removed, but the density of the current applied to the electrode is low. Therefore, the microorganisms cannot be destroyed using electric shock or hypochlorous acid, and the conductor periodically needs to be taken out to remove the microorganism adsorbed by the conductor with the reagent or the like, so that maintenance and management are laborious.

Moreover, in a case where it is considered that a greater part of the microorganisms in the for-treatment water is adsorbed and removed, the for-treatment water is passed through such a device many times. Alternatively, when the for-treatment water is passed once (one water passage) and treated, the water has to be passed at such a very low flow rate to such an extent that any force stronger than a coulomb force generated in the microorganisms is not generated. Thus, there has been a problem that a treatment efficiency is very low. This is because the surface of the conductor is not flat, and is therefore non-uniformly charged to lower a microorganism adsorption efficiency. Furthermore, the conductor is not sufficiently brought into close contact with a first electrode that energizes this conductor, so that a contact resistance between the conductor and the first electrode for the energization increases, and a current efficiency lowers.

SUMMARY OF THE INVENTION

The present invention has been developed to solve such a conventional technical problem, and an object thereof is to provide a water treatment device which improves the treatment efficiency of for-treatment water and which can sufficiently treat the for-treatment water passed therethrough once without repeatedly circulating the for-treatment water.

A water treatment device according to the present invention of a first aspect is characterized by comprising: a water passing first electrode arranged in a channel of for-treatment water; a conductive fiber positioned on the downstream side of this first electrode and electrically connected to the first electrode; a water passing second electrode positioned on the downstream side of this conductive fiber and forming a pair with the first electrode; an insulating porous spacer interposed between this second electrode and the conductive fiber; and supply means for supplying voltages to both of the electrodes.

The water treatment device according to the present invention of a second aspect is characterized in that in the above invention of the first aspect, the conductive fiber includes at least one selected from the group consisting of a carbon fiber, an active carbon fiber, a platinum fiber, a titanium fiber, a carbon nano tube, the carbon fiber coated with a catalyst, a resin fiber coated with the catalyst, the active carbon fiber coated with the catalyst, and the titanium fiber coated with the catalyst.

The water treatment device according to the present invention of a third aspect is characterized in that in the above invention of the first or second aspect, the conductive fiber is brought into close contact with the first electrode owing to the pressing force of the spacer.

The water treatment device according to the present invention of a fourth aspect is characterized in that in any of the above inventions of the first to third aspects, the spacer has a void ratio in excess of 95%.

The water treatment device according to the present invention of a fifth aspect is characterized in that in any of the above inventions of the first to fourth aspects, the channel where the spacer is positioned is narrower than a portion where the conductive fiber is positioned.

The water treatment device according to the present invention of a sixth aspect is characterized in that in any of the above inventions of the first to fifth aspects, the center of the first electrode is matched with that of the conductive fiber, and the supply means applies the voltages to the centers of both of the electrodes.

According to the present invention of the first aspect, the water treatment device comprises the water passing first electrode arranged in the channel of the for-treatment water, the conductive fiber positioned on the downstream side of this first electrode and electrically connected to the first electrode, the water passing second electrode positioned on the downstream side of this conductive fiber and forming the pair with the first electrode, the insulating porous spacer interposed between this second electrode and the conductive fiber, and the supply means for supplying the voltages to both of the electrodes. Therefore, when a positive potential is applied to the first electrode and a negative potential is applied to the second electrode, microorganisms in the for-treatment water can be adsorbed by the surface of the conductive fiber, and the adsorbed microorganisms can be trapped by the insulating porous spacer. When the negative potential is applied to the first electrode and the positive potential is applied to the second electrode, cations (calcium ions, magnesium ions or the like) forming scale components in the for-treatment water can be adsorbed by the surface of the conductive fiber, and a scale deposited by an electrocrystallizing reaction can be trapped by the insulating porous spacer.

According to the present invention of the second aspect, in the present invention of the first aspect, the conductive fiber preferably includes at least one selected from the group consisting of the carbon fiber, the active carbon fiber, the platinum fiber, the titanium fiber, the carbon nano tube, the carbon fiber coated with the catalyst, the resin fiber coated with the catalyst, the active carbon fiber coated with the catalyst, and the titanium fiber coated with the catalyst.

According to the present invention of the third aspect, in the present invention of the first or second aspect, the conductive fiber is brought into close contact with the first electrode owing to the pressing force of the insulating porous spacer, so that the contact resistance of the conductive fiber with respect to the first electrode can be lowered. In consequence, when the positive potential is applied to the first electrode, the surface of the conductive fiber is also charged with the positive potential, so that a contact area between the portion of the conductive fiber charged with the positive potential and the for-treatment water rapidly increases, and the trap efficiency of the microorganisms charged with the negative potential remarkably improves. Moreover, when the negative potential is applied to the first electrode, a contact resistance between a conductor and the first electrode to be energized lowers, and a current efficiency improves. Moreover, the removal efficiency of the scale components charged with the positive potential remarkably improves.

Moreover, when the conductive fiber comes in close contact with the first electrode, the contact surface of the conductive fiber with respect to the first electrode is flattened, so that the applied current can substantially uniformly be supplied to the surface of the conductive fiber. In consequence, the contact area between the charged portion of the conductive fiber and the for-treatment water rapidly increases, and an adsorption efficiency remarkably improves. Furthermore, the contact surface is flattened, whereby a distance between the surface of the conductive fiber on the side of the second electrode and the second electrode facing the surface of the conductive fiber is substantially uniform. In consequence, when a substantially uniform electric field is formed between the conductive fiber and the second electrode and the distance between the surface of the conductive fiber on the side of the second electrode and the second electrode is not uniform, a disadvantage that a large current locally flows through a portion having the shortest distance can be eliminated.

According to the present invention of the fourth aspect, in any of the inventions of the first to third aspects, the spacer has a void ratio in excess of 95%, whereby the treatment ratio of the for-treatment water can be improved.

According to the present invention of the fifth aspect, in any of the inventions of the first to fourth aspects, the channel where the spacer is positioned is narrower than the portion where the conductive fiber is positioned, whereby the first electrode and the second electrode are directly energized without using the conductive fiber or the spacer, and the applied current between the electrodes increases. In consequence, it can be prevented that chlorine is generated.

In the water treatment device according to the present invention of the sixth aspect, in any of the inventions of the first to fifth aspects, the center of the first electrode is matched with that of the conductive fiber, and the supply means applies the voltages to the centers of both of the electrodes, whereby the current can substantially uniformly be supplied into the conductive fiber.

DETAILED DESCRIPTION OF THE PREFERRED EMBODIMENTS

The present invention has been developed to solve the problem of a water treatment device having a conventional constitution in which microorganisms cannot sufficiently be removed from for-treatment water, if the for-treatment water is not repeatedly passed through the water treatment device or if the for-treatment water is not passed through the water treatment device at a very low speed. An object to provide a water treatment device capable of remarkably improving the treatment efficiency of the for-treatment water to sufficiently treat the for-treatment water even if the water is passed through the device only once has been realized by including a water passing first electrode arranged in the channel of the for-treatment water; a conductive fiber positioned on the downstream side of this first electrode and electrically connected to the first electrode; a water passing second electrode positioned on the downstream side of this conductive fiber and forming a pair with the first electrode; an insulating porous spacer interposed between this second electrode and the conductive fiber; and supply means for supplying voltages to both of the electrodes. It is to be noted that in a case where the present water treatment device is used in removing a scale, the supply means may have a polarity change function. Embodiments according to the present invention will hereinafter be described in detail with reference to the drawings.

Embodiment 1

Figure 1:
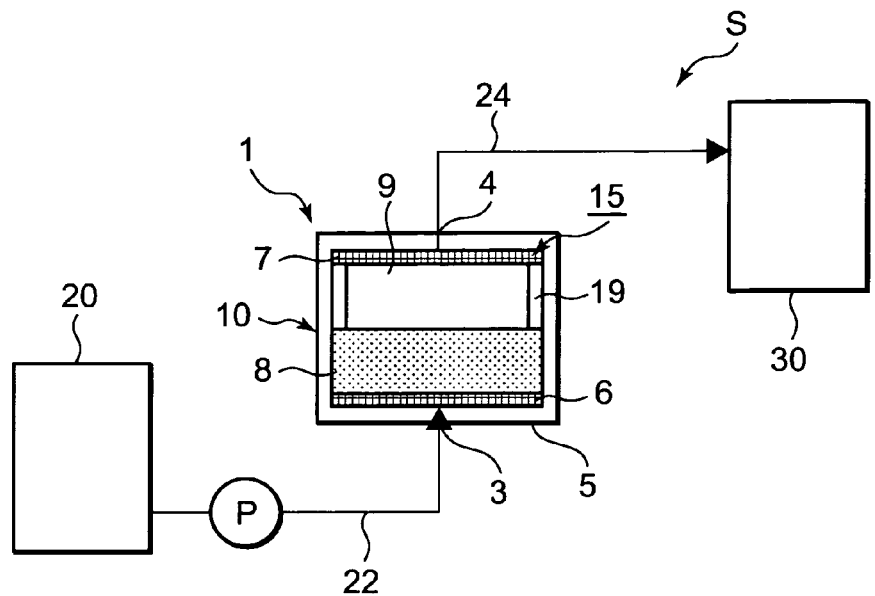
FIG. 1 is a schematic diagram of a system including a water treatment device according to one embodiment to which the present invention has been applied (Embodiment 1)

FIG. 1 is a schematic diagram showing a system S including a water treatment device according to one embodiment to which the present invention has been applied. The system S of the present embodiment is a water treatment system in which water (for-treatment water) such as rain water, ground water, water for beverage use, bath water or hot spring water received in a raw solution tank 20 is treated by a water treatment device 1 according to the present invention, and then received in a treated solution tank 30. The system is applied to, for example, a beverage manufacturing device or the like which treats the for-treatment water to form the water for beverage use. Then, the water treatment device 1 of the present invention is installed along the channel of the for-treatment water flowing from the raw solution tank 20 to the treated solution tank 30.

That is, the system S of the present embodiment is constituted by successively connecting the raw solution tank 20, the water treatment device 1 and the treated solution tank 30 via pipes. Specifically, the raw solution tank 20 is connected to a pipe 22 extending to the water treatment device 1 of the present invention. The raw solution tank 20 is a tank for receiving microorganisms, a scale and water (the for-treatment water) including a fine matter and the like. The pipe 22 extends externally from the raw solution tank 20 via one end of the pipe 22 which opens in the raw solution tank 20, and is connected to an inflow port 3 formed in the lower end of a treatment tank (case) 5 of the water treatment device 1 via a pump P, and the other end of the pipe 22 opens in a bottom portion in the case 5.

Moreover, an outflow port 4 is formed in the upper end of the case 5 of the water treatment device 1, and this outflow port 4 is connected to a pipe 24 extending to the treated solution tank 30. This pipe 24 extends externally from the case 5 via one end of the pipe which opens in the upper portion of the case 5 of the water treatment device 1, and is connected to the treated solution tank 30, and the other end of the pipe opens in an upper portion in the treated solution tank 30. The treated solution tank 30 is a tank for receiving the treated water from which the microorganisms and the like have been removed by the water treatment device 1.

Figure 2:
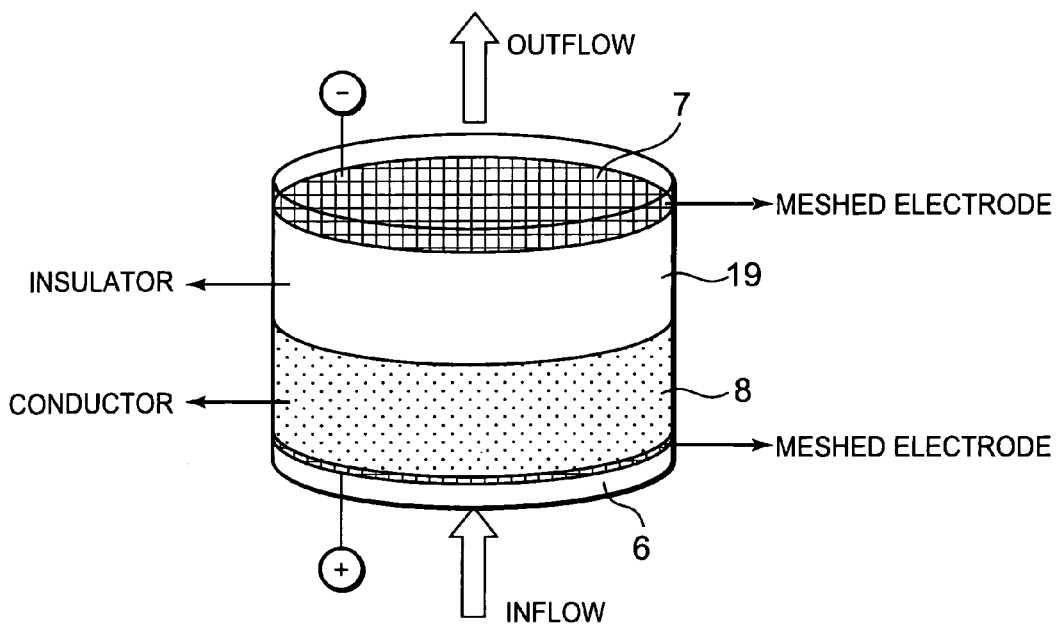
FIG. 2 is an explanatory view showing the water treatment device according to the present invention.
Figure 3:
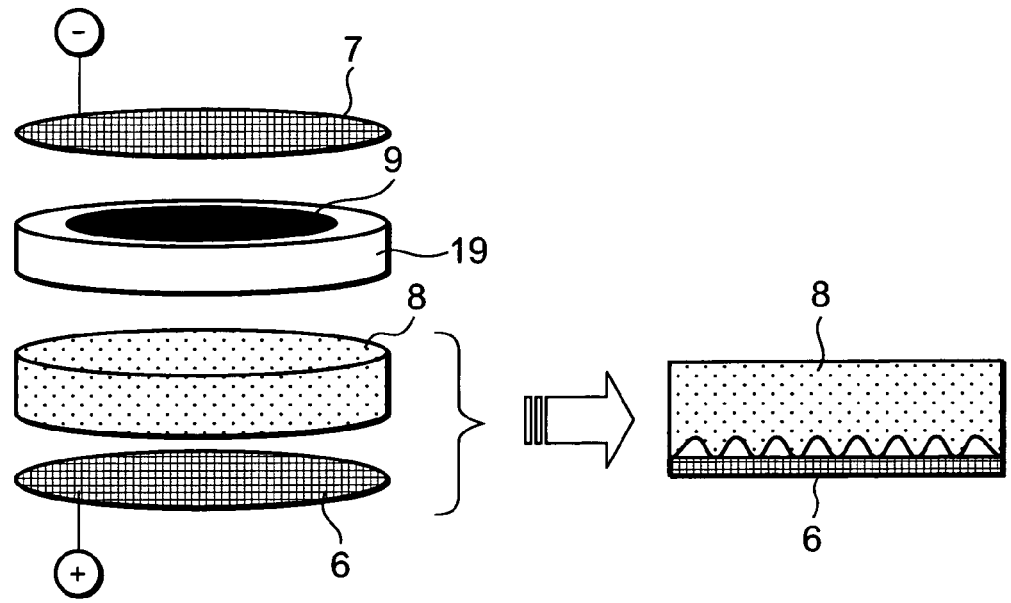
FIG. 3 is an explanatory view (an exploded diagram) showing the water treatment device according to the present invention.

Next, the water treatment device 1 of the present invention will be described with reference to FIGS. 2 to 4. FIGS. 2 and 3 show the explanatory views of the water treatment device 1 of FIG. 1, and FIG. 4 shows the vertical side view of the water treatment device 1 shown in FIG. 2, respectively.

The water treatment device 1 of the present embodiment is arranged along a channel through which the for-treatment water flows, and includes the case 5 having the lower end thereof provided with the inflow port 3 to introduce the for-treatment water from the raw solution tank 20 and having the upper end thereof provided with the outflow port 4; a meshed (netted) first electrode 6 disposed in this case 5 and having a water passing property; a conductive fiber 8 positioned on the downstream side of this first electrode 6, electrically connected to the first electrode 6 and having a water passing property; a meshed (netted) second electrode 7 positioned on the downstream side of this conductive fiber 8, forming a pair with the first electrode 6 and having a water passing property; an insulating porous spacer 9 interposed between the second electrode 7 and the conductive fiber 8 and having a water passing property.

Figure 4:
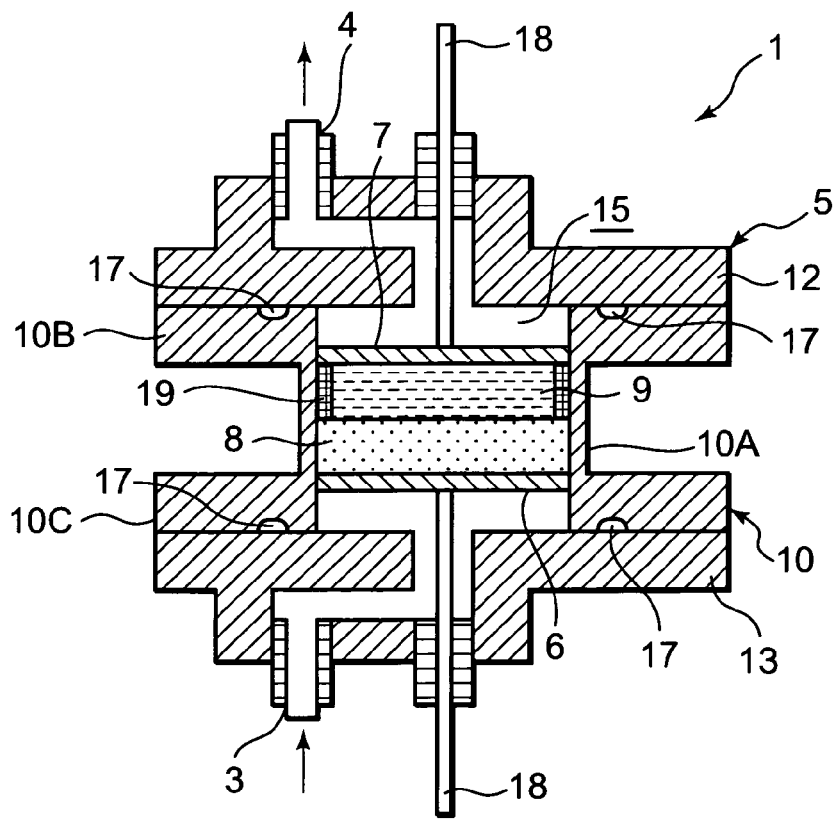
FIG. 4 is a vertical side view showing the water treatment device according to the present invention.

The case 5 is constituted of an insulating member such as glass or a resin material, and includes a main body 10, and lid members 12, 13 which close the upper and lower openings of this main body 10 (FIG. 4). The main body 10 includes a wall surface 10A having a vertically long cylindrical shape, and upper and lower edges 10B, 10C extending from the upper and lower ends of this wall surface 10A in a circumferential direction (a transverse direction in FIG. 4) and having a predetermined thickness. Then, a treatment chamber 15 in which the respective members (the meshed electrodes 6, 7, the conductive fiber 8 and the spacer 9) on the inner side of the wall surface 10A of the main body 10 are disposed is formed inside the wall surface 10A of the main body 10. In the embodiment, the inner diameter of the main body 10 (the inner diameter of the wall surface 10A) is set to 40 mm.

The lid member 12 is provided with a through hole through which the lid member 12 extends in an axial direction (a vertical direction in FIG. 4), and this through hole is the outflow port 4 for taking, from the water treatment device 1, the for-treatment water passed through the treatment chamber 15. The lid member 13 is also provided with a through hole through which the lid member extends in the axial direction (the vertical direction in FIG. 4) in the same manner as in the lid member 12, and this through hole is the inflow port 3 for introducing the for-treatment water from the raw solution tank 20 to the water treatment device 1.

Then, the lid member 12 is attached to the edge 10B of the main body 10 via an O-ring 17, and the lid member 13 is similarly attached to the edge 10C via an O-ring 17, whereby the case 5 is constituted. In consequence, according to the present embodiment, the lid members 12, 13 are attached to the edges 10B, 10C of the main body 10 via the O-rings 17 as seal members, respectively, to constitute the case 5, so that a seal property between the main body 10 and the lid members 12, 13 improves, and the water tightness of the case 5 can improve.

On the other hand, the electrodes 6, 7 are insoluble electrodes constituted by processing, into a meshed (netted) form, a unitary material such as platinum (Pt), iridium (Ir), tantalum (Ta), palladium (Pd), titanium or stainless steel or a conductor including at least one of platinum (Pt), iridium (Ir), tantalum (Ta), palladium (Pd), titanium and stainless steel. The electrodes 6, 7 are constituted of the same material. Specifically, as the electrodes 6, 7 of the present embodiment, there is used a platinum-iridium coated titanium electrode constituted by coating a titanium electrode with an alloy containing platinum and iridium, and processed into the whole meshed disc-like shape. That is, the respective electrodes 6, 7 are the electrodes processed into the meshed form and provided with such a water passing property that the for-treatment water can be passed through (the for-treatment water can be passed). Such meshed electrodes 6, 7 are formed into the disc-like shape having an outer diameter substantially equal to the inner diameter of the main body 10. Moreover, a current is supplied from a direct-current power source (supply means) (not shown) to the electrodes 6, 7 via power supply rods 18, and the values of voltages to be applied to both of the electrodes are controlled so that the value of the current passing between the electrode 6 and the electrode 7 is a constant value (a constant current). This power supply rod 18 is attached to the inflow port 3 or the outflow port 4 via a seal member 18A such as a packing.

Figure 9:
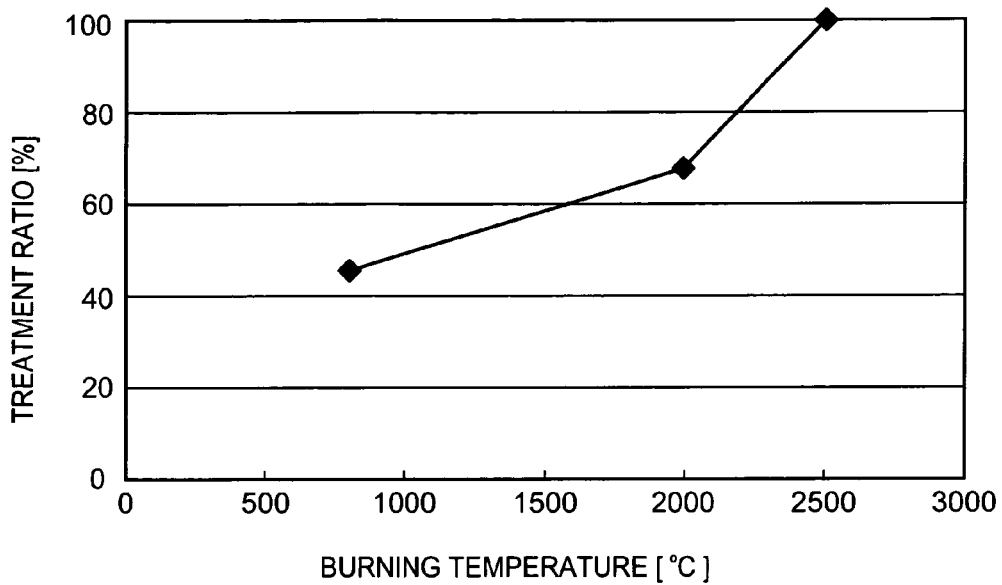
FIG. 9 is a diagram showing a relation between the calcination temperature of the conductive fiber and the treatment ratio of the microorganisms.

The conductive fiber 8 for use include one or two or more selected from the group consisting of a carbon fiber, an active carbon fiber, a platinum fiber, a titanium fiber, a carbon nano tube, the carbon fiber coated with a catalyst, a resin fiber (a resin fiber itself having conductivity, for example, a polyacetylene resin or the like doped with iodine, arsenic pentafluoride or the like, or a resin fiber blended with a conductive material as a composition) coated with the catalyst, the active carbon fiber coated with the catalyst, and the titanium fiber coated with the catalyst. In particular, the carbon fiber is preferable as the material of the conductive fiber 8, because the material is inexpensive and does not easily cause deterioration such as corrosion. The conductive fiber 8 is a porous block-like, sponge-like or felt-like fiber thus having a water passing property (the for-treatment water can be passed), and brought into close contact with the upper surface of the first electrode 6 on the downstream side of the electrode 6 along the channel. In particular, when the carbon fiber is used as the conductive fiber 8, the fiber calcinated at a high temperature is used, and this calcination temperature is set based on the treatment ratio of the for-treatment water as a target. FIG. 9 is a diagram showing the treatment ratio of the microorganisms in a case where in the water treatment device 1 of the present invention, the only calcination temperature of the carbon fiber for use was changed, and the for-treatment water (*Escherichia coli* number of $10^6$ CFU/ml) including the microorganisms (here, *Escherichia coli* was used as the microorganisms) was passed through the water treatment device 1. As shown in FIG. 9, it has been found that the calcination temperature of the carbon fiber rises, whereby the electric conductivity of the carbon fiber becomes satisfactory, a more uniform electric field is formed by the whole carbon fiber, and the treatment ratio of the for-treatment water improves. In particular, it has been found that when the calcination temperature is set to 2000° C. or more, the treatment ratio of the for-treatment water remarkably improves and that when the calcination temperature is set to 2500° C., the treatment ratio of the for-treatment water substantially becomes 100%. Therefore, in the present embodiment, as the carbon fiber, the felt-like fiber calcinated at 2000° C. or more (preferably, 2500° C.) is used.

Moreover, the conductive fiber 8 has such a structure that energization is not directly generated between the electrode 6 and the electrode 7. Specifically, in the present embodiment, it is constituted that at least the first electrode 6 does not protrude externally from the conductive fiber 8 in the cross sectional direction of the treatment chamber 15 as the channel of the for-treatment water. That is, the electrode 6 is formed into the disc-like shape having the outer diameter substantially equal to the inner diameter of the main body 10 as described above. Therefore, the conductive fiber 8 is similarly formed into the disc-like shape having the outer diameter substantially equal to the inner diameter of the main body 10 so that a cross section crossing, at right angles, the channel direction along which the for-treatment water flows is substantially the same. In consequence, the present embodiment has such a structure that the electrode 6 does not extend externally from the conductive fiber 8 in the cross sectional direction of the channel, whereby a disadvantage that the energization is directly generated between the electrode 6 and the electrode 7 can be avoided.

Then, the electrode 6 is arranged in the lower portion of the case 5 so that the outer peripheral wall of the electrode 6 abuts on the inner wall surface of the wall surface 10A of the main body 10, and the conductive fiber 8 is arranged on the upper surface of the electrode 6 on the downstream side of this electrode 6 along the channel of the for-treatment water in the treatment chamber 15 so that the center of the electrode 6 matches with that of the conductive fiber 8 and so that there is not any gap between the conductive fiber and the inner surface of the wall surface 10A of the main body 10.

On the other hand, the spacer 9 is provided so as to abut on the upper surface of the conductive fiber 8 on the downstream side of the channel of the conductive fiber 8. That is, the spacer 9 is interposed between the conductive fiber 8 and the electrode 7 positioned on the downstream side of the channel of the conductive fiber. As this spacer 9, an insulating (non-conductive) porous material (including a mesh shape) having a high void ratio is preferably used. Here, the void ratio is the ratio of void portions (air portions) present in the porous structure. Therefore, when the void ratio is high, the density (the bulk density) of the spacer 9 lowers (coarse). When the void ratio is low, the density of the spacer 9 increases (fine). As the insulating porous material, an insulating (non-conductive) resin (a PP resin, an acrylic resin, a fluorine resin or the like), a chemical fiber (a glass fiber, a polyester fiber or the like), non-woven cloth, paper or the like is used, but in the present embodiment, non-woven cloth of a polymer having a water passing property, for example, a polyvinylidene-chloride-based polymer such as polyester or Saran (manufactured by Asahi Kasei Corporation) having a large void ratio of 95% was used.

Moreover, the spacer 9 abuts on the upper surface of the conductive fiber 8 to press the conductive fiber 8, so that the conductive fiber 8 is pressed onto the first electrode by the pressing force of the spacer 9, and comes in close contact with the upper surface of the first electrode 6. In particular, an expandable conductive fiber (the carbon fiber or the like) is compressed by the pressing force of the spacer 9, pressed onto the first electrode and brought into close contact with the upper surface of the first electrode 6. That is, as enlarged and shown on the right side of FIG. 3, the lower surface (similarly the upper surface) of the conductive fiber before pressed is not flat, and has an irregular shape. However, the spacer 9 is provided on the upper surface of the conductive fiber 8, and the conductive fiber 8 is compressed by the pressing force of this spacer 9, whereby the close contact force of the conductive fiber 8 with the electrode 6 can further be increased. In consequence, the conductive fiber 8 is brought into close contact with the electrode 6, whereby this conductive fiber 8 is electrically connected to the electrode 6. Moreover, a contact resistance with respect to the electrode 6 is lowered, and a part of the electrode 6 is formed.

Figure 5:
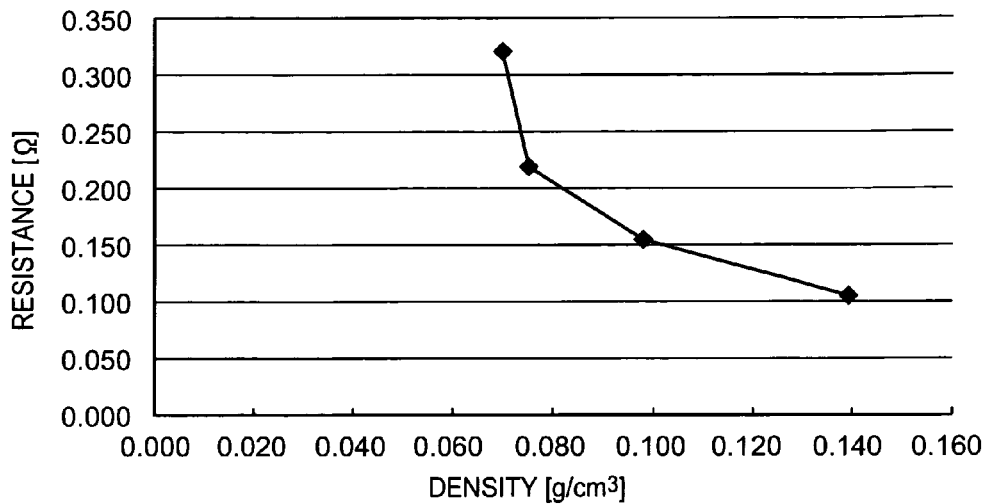
FIG. 5 is a diagram showing a relation between the density of a carbon fiber brought into close contact with a first electrode and the contact resistance of the fiber with respect to this electrode.

FIG. 5 shows a relation between a density and a contact resistance with the electrode 6 in a case where the carbon fiber is used as the conductive fiber 8. In FIG. 5, the abscissa indicates the density ($g/cm^3$) of the carbon fiber. This density has a proportionality relation with respect to the compression ratio of the carbon fiber. That is, when the carbon fiber is compressed by the spacer 9 (the compression ratio is high), the density increases. The ordinate indicates a contact resistance ($\Omega$) between the carbon fiber and the electrode 6. It is seen from FIG. 5 that when the density of the carbon fiber increases, that is, when the spacer 9 compresses the carbon fiber harder, the electrode 6 is brought into close contact with the electrode 6, and the contact resistance of the carbon fiber with the electrode 6 lowers.

Therefore, in the present embodiment, the conductive fiber 8 is brought into close contact with the electrode 6 by the spacer 9 to such an extent that any problem is not generated in the circulation of the for-treatment water, and the contact resistance with the electrode 6 is minimized. The contact resistance with the electrode 6 is suppressed in this manner, whereby the conductive fiber 8 is easily energized, and the whole conductive fiber 8 can be a part of the electrode 6. In consequence, ions and microorganisms are attracted by charges on the surface of the conductive fiber 8. For example, when a positive potential is applied to the first electrode 6, the contact resistance between the conductor and the first electrode to be energized lowers, and a current efficiency improves. Moreover, the removal efficiency of the scale components charged with the positive potential remarkably improves. In particular, when the carbon fiber is used as the conductive fiber, the calcination temperature is adjusted, and the density is adjusted in accordance with the pressing force of the spacer 9, whereby the treatment ratio of the for-treatment water can be changed. Therefore, the density and the calcination temperature of the carbon fiber are set based on a targeted treatment ratio, whereby the optimum water treatment device 1 can be constituted in accordance with the type and application of the for-treatment water.

Furthermore, the spacer 9 is provided, whereby the surface of the conductive fiber 8 on the side of the electrode 7 (i.e., the upper surface in the present embodiment) can be flattened. That is, as described above, the conductive fiber 8 is brought into close contact with the electrode 6, so that the whole conductive fiber 8 constitutes a part of the electrode 6. However, when the upper surface of the conductive fiber 8 is not flat, a distance between the conductive fiber and the counter electrode 7 becomes non-uniform. Therefore, the current does not uniformly flow through the conductive fiber 8, which causes a disadvantage that a large current locally flows through a portion where the upper surface of the conductive fiber 8 is closest to the lower surface of the electrode 7 (i.e., the portion having the shortest distance).

In particular, in the conductive fiber 8 coated with the catalyst, a catalyst layer easily peels from the portion where the large current locally flows, and hence the portion easily deteriorates, which causes a problem that the life of the conductive fiber 8 shortens. To solve the problem, the spacer 9 is arranged on the upper surface of the conductive fiber 8 as in the present invention, whereby the surface of the conductive fiber on the side of the electrode 7 (i.e., the upper surface in the present embodiment) can be flattened. In consequence, the distance between the conductive fiber 8 and the electrode 7 can be substantially uniform. Therefore, the disadvantage that the large current locally flows through the conductive fiber 8 can be eliminated.

It is to be noted that in the present embodiment, the cross section of the first electrode 6 is formed to be substantially the same as that of the conductive fiber 8 as described above, so that the center of the electrode 6 is matched with that of the conductive fiber 8 to allow the whole upper surface of the first electrode 6 to abut on the whole lower surface of the conductive fiber 8.

On the other hand, the spacer 9 of the present embodiment is formed into a disc-like shape in the same manner as in the conductive fiber 8, but the outer diameter of the spacer is smaller than that of the conductive fiber 8. Then, the spacer 9 is brought into close contact with the upper surface of the conductive fiber 8 so that the center (the center in an axial center direction) of the spacer matches with the center (the center in the axial center direction) of the conductive fiber 8. The spacer 9 is arranged on the conductive fiber 8 in a state in which a stationary ring 19 is attached to the outer periphery of the spacer. The inner diameter of the stationary ring 19 is formed to be substantially equal to the outer diameter of the spacer 9, and it is constituted that the outer peripheral surface of the spacer 9 can be held by the inner peripheral surface of the stationary ring 19. Moreover, it is constituted that the outer diameter of the stationary ring 19 is substantially equal to the inner diameter of the wall surface 10A of the main body 10 and that when the stationary ring 19 is attached to the main body 10, there is not any gap between the wall surface 10A and the stationary ring 19.

Thus, the outer diameter of the spacer 9 is smaller than that of the conductive fiber 8, and the stationary ring 19 having the outer diameter equal to the inner diameter of the wall surface 10A of the main body is attached to the outer peripheral surface of the spacer 9 in a space generated owing to this smaller outer diameter of the conductive fiber 8, whereby a channel where the spacer 9 is positioned is narrower than a portion where the conductive fiber 8 is positioned. In consequence, even if a slight gap is present between the outer peripheral surface of the conductive fiber 8 and the inner peripheral surface of the wall surface 10A of the main body 10 and the for-treatment water passed through the electrode 6 flows through this gap, the water flows on an inner side (on the side of the inner diameter) owing to the stationary ring 19 positioned on the upper surface of the conductive fiber 8, and the water passes through the conductive fiber 8 positioned here. In consequence, a disadvantage that energization is directly performed between the electrodes 6 and 7 can be prevented.

In particular, the stationary ring 19 is attached to the outer periphery of the spacer 9 as in the present embodiment, whereby a disadvantage that the spacer 9 moves can be eliminated, and the pressing force to press the upper surface of the conductive fiber 8 increases owing to the weight of the stationary ring 19. Therefore, the conductive fiber 8 can be brought into closer contact with the electrode 6, and the upper surface of the conductive fiber 8 can further be flattened, so that a more uniform electric field can be obtained on the upper surface of the conductive fiber 8. In consequence, the treatment efficiency can further be improved.

Figure 6:
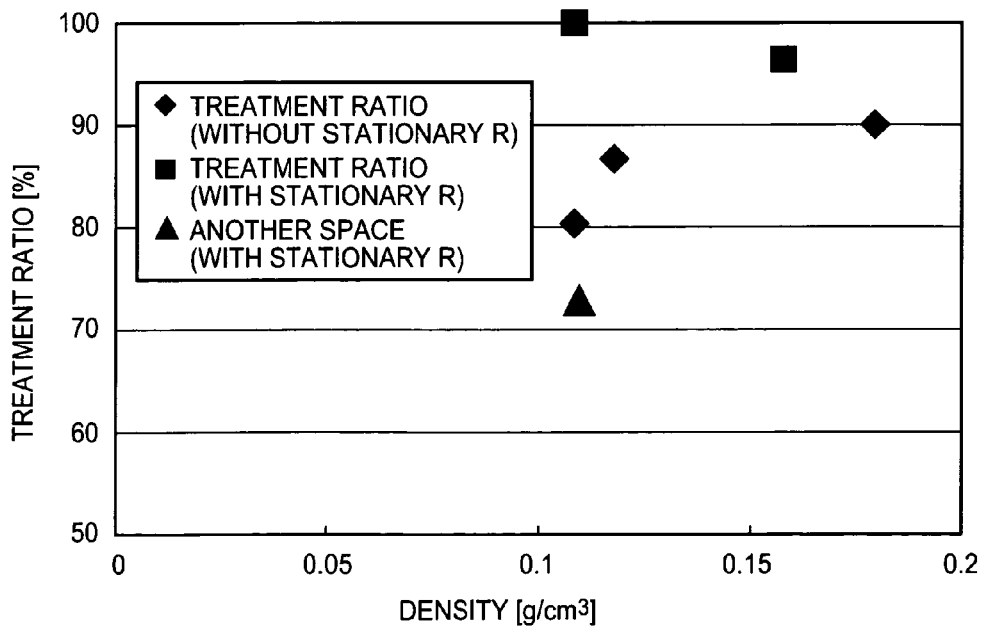
FIG. 6 is a diagram showing the change of a treatment ratio accompanying a spacer density change.

Here, the above-mentioned effects of the spacer 9 and the stationary ring 19 will be described with reference to FIG. 6. In FIG. 6, the abscissa indicates the density of the spacer 9, and the ordinate indicates the treatment ratio of the microorganisms in a case where the for-treatment water (the *Escherichia coli* number of $10^6$ CFU/ml) including the microorganisms (*Escherichia coli* is used as the microorganisms in FIG. 6) is passed through the water treatment device 1 once. Rhombic and square points indicate the treatment ratios of the microorganisms included in the for-treatment water in a case where the spacer 9 of the present invention is provided on the upper surface of the conductive fiber 8, and a triangular point indicates the treatment ratio of the microorganisms included in the for-treatment water in a case where another spacer (a spacer made of a polymer resin) is provided on the upper surface of the conductive fiber 8. Furthermore, the rhombic point indicates the result of the treatment ratio in a case where the channel where the spacer 9 is positioned is the same as the portion where the conductive fiber 8 is positioned (i.e., the channel where the spacer 9 is positioned is not narrower than the portion where the conductive fiber 8 is positioned) and any stationary ring 19 is not installed, and the square point indicates the result of the treatment ratio in a case where the channel where the spacer 9 is positioned is narrower than the portion where the conductive fiber 8 is positioned and the stationary ring 19 is installed in the outer periphery of the spacer 9.

As shown in FIG. 6, in a case where the spacer made of the polymer resin different from the spacer 9 (the resin spacer) of the present invention is provided on the upper surface of the conductive fiber 8, the treatment ratio is 75% or less. On the other hand, when the spacer 9 of the present invention is provided, the treatment ratio is 80% or more. Furthermore, when the channel where the spacer 9 is positioned is narrower than the portion where the conductive fiber 8 is positioned (the stationary ring 19 is provided), the treatment ratio is 90% or more.

Thus, it has been found that the treatment ratio of the microorganisms changes in accordance with the presence of the stationary ring 19 and the type and density of the spacer.

That is, in a case where the stationary ring 19 is provided so that the channel where the spacer 9 is positioned is narrower than the portion where the conductive fiber 8 is positioned, as compared with a case where any stationary ring 19 is not provided, all the for-treatment water passes through the conductive fiber 8, and the treatment efficiency improves. Thus, the outer periphery of the spacer 9 is provided with the stationary ring 19, and further the channel where the spacer 9 is positioned is narrower than the portion where the conductive fiber 8 is positioned, whereby all the for-treatment water passes through the conductive fiber 8, and hence the treatment efficiency obtained by the conductive fiber 8 can be improved. Furthermore, the spacer 9 and the stationary ring 19 are attached as in the present embodiment, whereby the upper surface of the conductive fiber 8 can further be flattened. Therefore, a uniform electrolytic reaction can be obtained on the upper surface of the conductive fiber 8, and an electrolytic efficiency can further be improved.

Moreover, it has been found that even in a case where the spacer has an equal density, when the polymer resin spacer different from the spacer of the present invention is used, the treatment efficiency of the for-treatment water lowers. That is, it has been found that the treatment ratio changes in accordance with the type of the spacer.

Furthermore, when the spacer 9 having a void ratio of 94% is used and the stationary ring 19 is attached to the outer periphery of this spacer 9 to treat the microorganisms (*Escherichia coli* described above) in the for-treatment water, the treatment ratio is 81%. Subsequently, when the spacer 9 having a void ratio of 98% is used and the microorganisms in the for-treatment water are treated, the treatment ratio is 98%. The void ratio is changed in this manner, and the treatment ratio is checked. As a result, it has been found that when the void ratio is above 95% and the for-treatment water is only passed through the water treatment device 1 once, the microorganisms in the for-treatment water can sufficiently be treated. It has been found that the density, that is, the void ratio of the spacer 9 can be changed to adjust the treatment ratio.

On the other hand, the electrode 7 is arranged in the upper portion of the case 5 so that the outer peripheral wall of the electrode 6 abuts on the inner wall surface of the wall surface 10A of the main body 10. This electrode 7 is arranged in a state in which the electrode is brought into close contact with the upper surface of the spacer 9 on the most downstream side of the channel of the for-treatment water from the members (the electrode 6, the conductive fiber 8 and the spacer 9 (also including the 19)) in the treatment chamber 15. In the present embodiment, a space between the conductive fiber 8 constituting a part of the electrode 6 arranged in the treatment chamber 15 and the electrode 7, that is, a distance between the surface (the upper surface) of the conductive fiber 8 on the electrode 7 side and the lower surface of the electrode 7 is 19 mm.

On the other hand, one end of each power supply rod 18 is arranged so as to abut on the center of the lower surface of the electrode 6 or the upper surface of the electrode 7. The power supply rods 18 are provided so as to apply voltages from a power source (not shown) to the respective electrodes 6, 7. The power supply rod 18 of the embodiment is processed into a vertically long cylindrical shape made of titanium and having a diameter of 3 mm. Such power supply rods 18 are present, whereby the voltages can be applied to the centers of the respective electrodes 6, 7, and the fiber can be energized. In particular, the conductive fiber 8 is brought into close contact with the upper surface of the electrode 6 so that the center of the conductive fiber matches with that of the electrode 6 as described above. Therefore, the voltage is applied from the power supply rod 18 to the electrode 6 via the center of the electrode 6, whereby the conductive fiber 8 can uniformly be energized. In consequence, the electrolytic efficiency can be improved. It is to be noted that as described above, the power supply rods 18 are arranged on the centers of the lower surface of the electrode 6 and the upper surface of the electrode 7, and the voltages are applied to the centers of the electrodes 6, 7, so that the inflow port 3 and the outflow port 4 of the present embodiment are constituted in the form of a key as shown in FIG. 4.

In the water treatment device 1 having the above constitution, the for-treatment water from the raw solution tank 20 enters the treatment chamber 15 formed in the case 5 from the inflow port 3 formed in the lid member 13 of the case 5. The water successively passes through the electrode 6, the conductive fiber 8, the spacer 9 and the electrodes, and then exits from the outflow port 4 formed in the lid member 12. The channel constituted in this treatment chamber 15 so that the for-treatment water flows through the channel is constituted around the center of the surface (the lower surface in the present embodiment) of the conductive fiber 8 on the electrode 6 side. In consequence, the for-treatment water can uniformly be passed through the conductive fiber 8, so that the treatment efficiency of the for-treatment water can be improved.

Next, the operation of the system S will be described. The operation of the system S is controlled by, for example, a controller. The controller is control means for controlling the operation of a pump P, the energization of the respective electrodes 6, 7 and the like in the system S, and is constituted of a general-purpose microcomputer. Then, the controller executes the following processing operation in accordance with a preset program.

(1) First Treatment Process (Microorganism Removal)

First, an operation of removing the microorganisms in the for-treatment water will be described. The controller starts the pump P, and applies the voltage to the electrode 6 via the power supply rod 18. When the electrode 6 is set to the positive potential, the conductive fiber 8 is charged with the positive potential. Therefore, the second electrode 7 indicates a negative potential. In the present embodiment, the conductive fiber 8 having an outer diameter of 40 mm or less is installed along the channel having an inner diameter of 40 mm. Therefore, the set current value of the controller is 60 milliamperes (mA) or more, and the voltages are applied to the respective electrodes 6, 7 with a high current value in a range below a value at which the conductive fiber 8 is dissolved. Moreover, the pump P is controlled by the controller so that the flow rate of the for-treatment water flowing into the water treatment device 1 is 400 ml/min.

The pump P is operated, whereby the for-treatment water flows from the inflow port 3 to the treatment chamber 15 in the case 5 of the water treatment device 1. In consequence, the electrode 6, the conductive fiber 8, the spacer 9 and the electrode 7 in the treatment chamber 15 are immersed into the for-treatment water. Then, the for-treatment water which has flowed into the treatment chamber 15 successively passes through the electrode 6, the conductive fiber 8, the spacer 9 and the electrode 7, and then finally flows from the outflow port 4. At this time, microorganisms such as bacteria and mold included in the for-treatment water are adsorbed by the surface of the conductive fiber 8, exposed to a flowing solution, and trapped by the spacer 9 owing to a filter effect.

In consequence, when the voltages are applied to the electrodes 6, 7 in the above-mentioned range of the set current value of the controller, the electrode 6 on the upstream side of the channel of the for-treatment water and the conductive fiber 8 electrically connected to this electrode 6 are anodes (positive potentials), and the electrode 7 on the downstream side is a cathode (a negative potential).

Here, the microorganisms are usually charged with the negative potential, whereby the microorganisms are attracted by the surface of the conductive fiber 8 charged with the positive potential.

Furthermore, when the voltages are applied to the electrodes 6, 7 as described above, the electrolysis of water occurs. That is, in a case where the for-treatment water in the treatment chamber 15 is energized by the electrodes 6, 7, the following reaction occurs in the electrode 6 and the conductive fiber 8 which are the anodes:

$$2H_2O \rightarrow 4H^+ + O_2 + 4e^-.$$

The following reaction occurs in the electrode 7 which is the cathode:

$$4H^+ + 4e^- + (4OH^-) \rightarrow 2H_2 + (4OH^-).$$

Chloride ions included in the for-treatment water react as follows:

$$2Cl^- \rightarrow Cl_2 + 2e^-.$$

Furthermore, this $Cl_2$ reacts with water as follows:

$$Cl_2 + H_2O \rightarrow HClO + HCl.$$

In this constitution, the contact resistance between the conductor and the first electrode to be energized lowers, and the current efficiency improves, so that the efficiency of the formation of sterile water including hypochlorous acid (HClO) can remarkably be improved.

Figure 7:
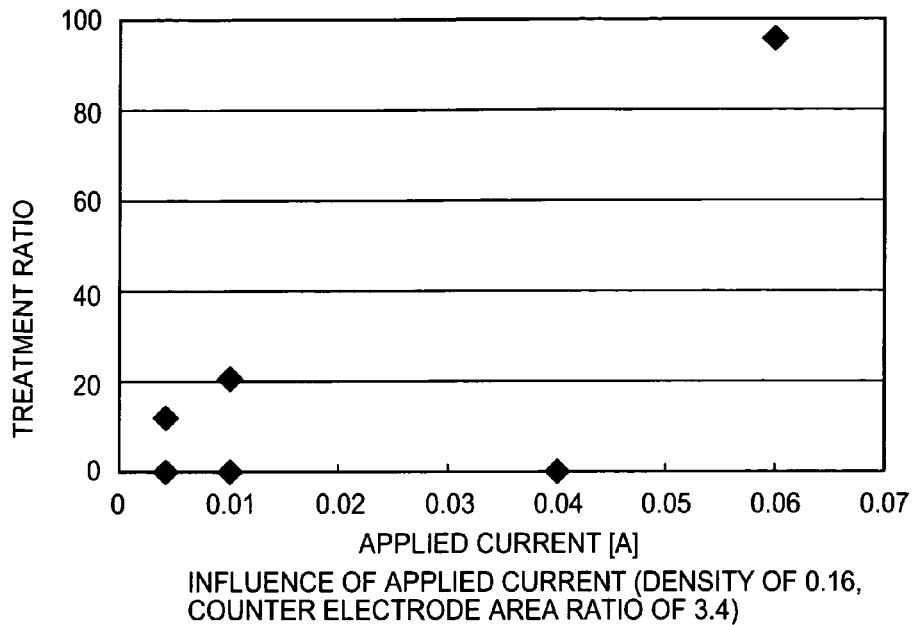
FIG. 7 is a diagram showing a relation between an applied current and the treatment ratio of microorganisms.

Furthermore, in the present embodiment, as described above, a current having a high current value of 60 mA or more is supplied to the electrodes 6, 7, so that the respective electrodes 6, 7 are energized to extinguish the microorganisms in the for-treatment water. FIG. 7 is a diagram showing a relation between the applied current and the treatment ratio of the microorganisms in a case where the carbon fiber is used in the conductive fiber 8. It is to be noted that this treatment ratio is also the treatment ratio of the microorganism (*Escherichia coli* is similarly used as described above) in the for-treatment water in a case where the for-treatment water is passed through the water treatment device 1 once. In this case, the carbon fiber having a density of 0.16 g/cm³ is used, and the electrodes 6, 7 having a counter electrode area ratio of 3.4 are used. As shown in FIG. 7, in a case where the applied current is lower than a current value of 60 mA (0.06 A shown in FIG. 7), the treatment ratio of the microorganisms is as remarkably low as about 0% to 20%. On the other hand, it has been found that when the current value is 60 mA, the treatment ratio is 90% or more.

That is, the potentials are applied to the electrodes 6, 7 so as to obtain a high current value of 60 mA or more, in addition to an effect that the microorganisms in the for-treatment water are effectively extinguished by HClO, there is an effect that the electrodes 6, 7 can be energized to extinguish the microorganisms in the for-treatment water owing to an electric shock. In consequence, it has been apparent that the treatment ratio of the microorganisms in the for-treatment water rapidly improves and that the for-treatment water can be passed through the water treatment device 1 only once to sufficiently remove and treat the microorganisms in the for-treatment water.

Figure 8:
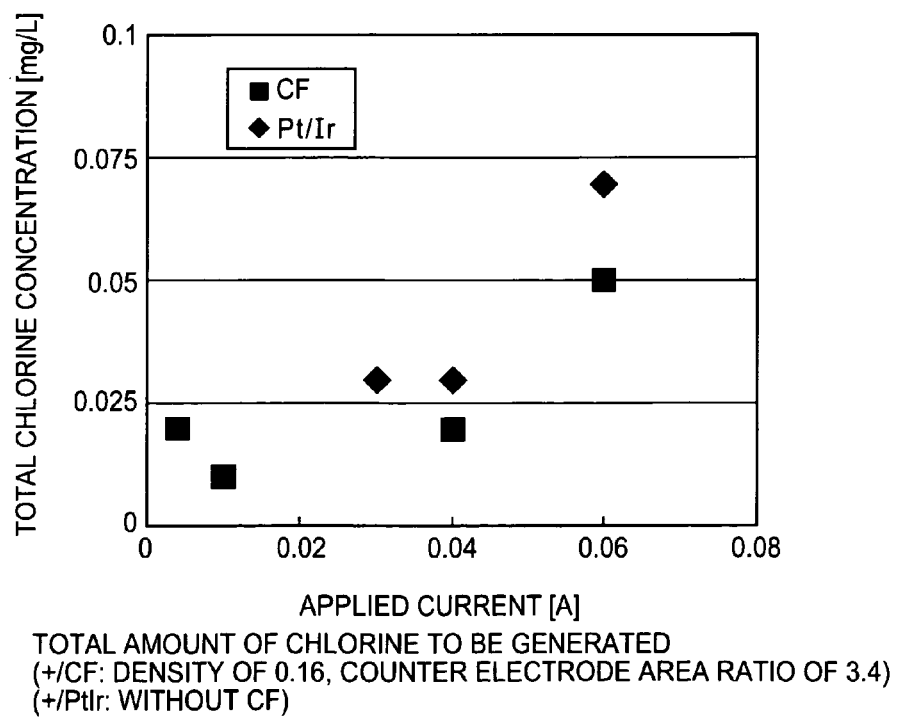
FIG. 8 is a diagram showing a relation between a current value to be applied to the electrode and the total concentration of chlorine in for-treatment water.

Moreover, in a case where a high current value is applied, there occur disadvantages that chlorine generated by an electrolytic treatment increases and that chlorine odor gives discomfort. FIG. 8 shows a relation between the values of the currents to be applied to the electrodes 6, 7 and the total chlorine concentration in the for-treatment water. In FIG. 8, the abscissa indicates the values (A) of the currents to be applied to the electrodes 6, 7, and the ordinate indicates the total chlorine concentration in the for-treatment water. That is, when the total chlorine concentration is high, the amount of chlorine to be generated increases, and the chlorine odor increases. Moreover, in FIG. 8, rhombic points indicate results in a case where any conductive fiber 8 is not provided, and square points indicate results in a case where the conductive fiber 8 is brought into close contact with the upper surface of the electrode 6, and provided thereon as in the present invention.

As shown in FIG. 8, in a case where any conductive fiber 8 is not provided and a current of 60 mA (0.06 A shown in FIG. 8) is applied to the only electrodes 6, 7, the total chlorine concentration in the for-treatment water is as high as 0.075 mg/L. On the other hand, when the conductive fiber 8 is brought into close contact with and provided on the electrode 6 and the current having an equal value (60 mA) is applied to the electrodes 6, 7, the total chlorine concentration in the for-treatment water is 0.05 mg/L, and the concentration is remarkably low as compared with a case where any conductive fiber 8 is not provided. This is supposedly because when the conductive fiber 8 is brought into close contact with the electrode 6 to constitute a part of the electrode 6, the surface area of the electrode 6 increases. Therefore, even when the equal current value is applied, the current density decreases. As a result, the amount of hypochlorous acid to be generated decreases.

That is, the amount of hypochlorous acid to be generated is proportional to the current density, so that even when a large current is applied, the excessive generation of the hypochlorous acid can be prevented by providing the conductive fiber 8 as in the present invention. In consequence, the generation of the chlorine odor can be suppressed. On the other hand, as described above, the large current can be supplied to promote the death of the microorganisms from electricity. Therefore, according to the present invention, the sterilization of the microorganisms can effectively be performed while suppressing the generation of the chlorine odor, and a treatment capability can remarkably be improved. Furthermore, according to a structure in which the first electrode 6 and the second electrode 7 are not directly energized via the conductive fiber 8 and the spacer 9 as described above, it is possible to eliminate disadvantages that the current applied between the electrodes increases owing to the direct energization and that chlorine is excessively generated.

(2) Second Treatment Process (Scale Removal)

Next, an operation of removing scale components from the for-treatment water will be described. First, the controller starts the pump P, and applies the voltage via the power supply rod 18. When the electrode 6 is set to the negative potential, the conductive fiber 8 is also set to the negative potential. Therefore, the electrode 7 has a positive potential. In the present embodiment, the conductive fiber 8 having an outer diameter of 40 mm or less is installed in a channel having an inner diameter of 40 mm, so that the set current value of the controller is 60 milliamperes (mA), and the voltages are applied to the respective electrodes 6, 7 in the range below the current value at which the conductive fiber 8 is dissolved. Moreover, the controller controls the pump P so that the flow rate of the for-treatment water which flows into the water treatment device 1 is 400 ml/min.

In consequence, the electrode 6 and the conductive fiber 8 on the upstream side of the channel of the for-treatment water are cathodes (negative potentials), and the electrode 7 on the downstream side is an anode (a positive potential). That is, when the for-treatment water in the case 5 is energized by the electrodes 6, 7, the following reaction occurs in the electrode 6 and the conductive fiber 8 which are the cathodes:

$$4H^+ + 4e^- + (4OH^-) \rightarrow 2H_2 + (4OH^-).$$

The following reaction occurs in the electrode 7 which is the anode:

$$2H_2O \rightarrow 4H^+ + O_2 + 4e^-.$$

As described above, hydroxide ions (OH⁻) are formed in the conductive fiber 8 as the cathode. The hydroxide ions are very strong bases, so that the negatively charged surface of the conductive fiber 8 is locally alkaline. In consequence, hard components in the for-treatment water react with the hydroxide ions to form a salt. Specifically, the ions of calcium, magnesium, potassium, silica and the like included as the scale components in the for-treatment water are deposited as salts which are not easily soluble, for example, calcium hydroxide, calcium carbonate, magnesium hydroxide and the like. It is to be noted that when the for-treatment water contains the ions of phosphorus, sulfur, zinc and the like, calcium sulfate, calcium sulfite, calcium phosphate, zinc phosphate, zinc hydroxide, basic zinc carbonate and the like are sometimes deposited as the salts. It is to be noted that a part of the ions of calcium, magnesium, potassium, silica and the like constituting the scale components is directly deposited even on the conductive fiber 8 owing to an electrocrystallizing function.

Moreover, the salts (i.e., scales) deposited on the conductive fiber 8 flow into the spacer 9 positioned on the downstream side of the channel of the for-treatment water in the conductive fiber 8, and are collected by the spacer 9. The salt (the scale) deposited on the conductive fiber 8 in this manner is deposited on the negatively charged surface of the conductive fiber 8, and the deposited scale can be collected by the spacer 9. Moreover, the spacer 9 is installed between the conductive fiber 8 and the electrode 7 positioned on the downstream side of the conductive fiber, and the for-treatment water is passed from the conductive fiber 8 on the cathode side to the electrode 7 on the anode side, whereby the scale deposited on the conductive fiber 8 side can efficiently be collected by the spacer 9.

Furthermore, as described above, the electrodes 6, 7, the conductive fiber 8 and the spacer 9 have a water passing structure, and the spacer 9 is an insulator, whereby the scale can be collected by the spacer 9 while circulating the for-treatment water without any trouble.

Moreover, the spacer 9 is installed between the conductive fiber 8 and the electrode 7, and the for-treatment water is passed from the conductive fiber 8 on the cathode side to the electrode 7 on the anode side, whereby it can be prevented that the scale deposited on the conductive fiber 8 is attached to the conductive fiber 8. In particular, when the flow rate of the for-treatment water is high, the scale once attached to the conductive fiber 8 easily peels, and the peeled scale can be collected by the spacer 9 arranged on the downstream side of the conductive fiber 8. In consequence, the scale deposited on the conductive fiber 8 can be prevented from being accumulated in the conductive fiber 8, and short-circuit and deterioration of the conductive fiber can be minimized.

To discharge the collected scale, usually when the polarity of the potential to be applied to the electrodes 6, 7 is reversed, the conductive fiber 8 is the anode (the positive potential), so that the surface of the conductive fiber is locally acidified owing to an electrolytic reaction, and the scale deposited on the surface of the conductive fiber is dissolved. The scale attached to the spacer is also dissolved, and discharged as a cation from the downstream side. When a large amount of scale is attached, the circulation of the for-treatment water might be disturbed, so that the spacer 9 needs to be replaced. To replace this spacer 9, first, power supply to the system S is cut, and the energization to the electrodes 6, 7 is stopped. Afterward, the lid members 12 and 13 of the case 5 are removed, and the electrode 6 is pushed externally from one opening of the main body 10, for example, the opening of the lower end to the upper end, whereby the electrode 7, the stationary ring 19, the spacer 9, the conductive fiber 8 and the electrode 6 can be removed from the opening of the upper end and replaced. Alternatively, one of the lid members (the lid member 12 or 13) may be removed. For example, the lid member 12 may be removed, and these members may be pulled from this corresponding portion and replaced.

Then, after the replacement, the members are successively arranged in the main body 10 again, and the respective lid members 12, 13 are attached to the edges 10B, 10C of the main body 10 via the O-ring 17, whereby the highly sealable case 5 can easily be assembled.

It is to be noted that in the present second treatment process (the operation of removing the scale components from the for-treatment water), the controller may apply a current value below 60 mA to the electrodes 6, 7, instead of applying a high current of 60 mA or more in the range below the current value at which the conductive fiber 8 is dissolved as in the first treatment process (the operation removing the microorganisms from the for-treatment water).

That is, even when the current value is set to such a value, the salt (the scale) can be deposited by the electrode 6, and this scale can sufficiently be collected by the electrode 6 and the conductive fiber 8.

Moreover, in the same manner as in the above embodiment, the high current of 60 mA or more may be applied to the electrodes 6, 7 in the range below the current density at which the conductive fiber 8 is dissolved. In this case, the death of the microorganisms from electricity due to such a large current is caused, so that in this second treatment process, the treatment effect of the microorganisms can be expected in addition to the scale removal effect in the for-treatment water.

Figure 10:
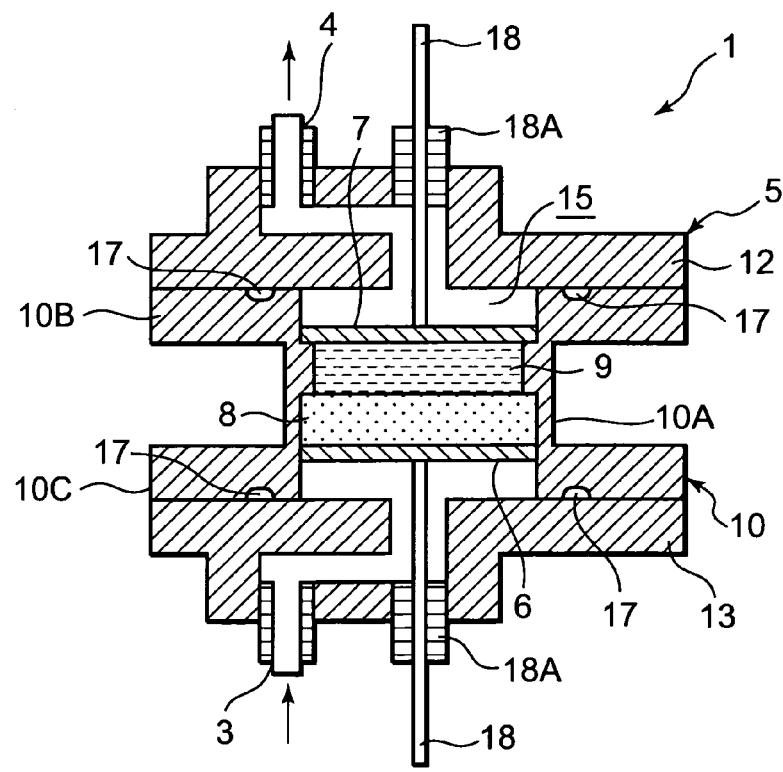
FIG. 10 is a vertical side view showing a water treatment device according to another embodiment of the present invention.

It is to be noted that in the present embodiment, the stationary ring 19 is attached to the outer periphery of the spacer 9, and the channel where the spacer 9 is positioned is narrower than the portion where the conductive fiber 8 is positioned. However, the present invention is not limited to a case where the stationary ring 19 is attached. For example, as shown in FIG. 10, the shape of the main body 10 itself where the spacer 9 is positioned may be protruded on an inner peripheral side, and the channel where such a spacer 9 is positioned may be narrower than the portion where the conductive fiber 8 is positioned. Another shape is effective as long as the channel where the spacer 9 is positioned is narrower than the portion where the conductive fiber 8 is positioned.

Here, a difference between the technology (the prior art) disclosed in Patent Document 1 described in the background art and the present invention will be described. In the prior art, the surface of the carbon fiber is non-uniformly charged, whereas in the present invention, the surface of the carbon fiber is uniformly charged. The insulating porous spacer comes in close contact with the surface of the carbon fiber, so that a reactive area on the surface of the carbon fiber is large, and a treated substance can be collected by the insulating porous spacer. Therefore, the conductive fiber is not clogged with any microorganism or scale. In consequence, overvoltage generated during clogging can be avoided, and the deterioration of the conductive fiber can be avoided.

Embodiment 2

It is to be noted that in Embodiment 1 described above, the water treatment device 1 to which the present invention is applied is disposed in the system S shown in FIG. 1 in which the for-treatment water received in the raw solution tank 20 is treated and received in the treated solution tank 30, but the present invention is not limited to this embodiment. The water treatment device 1 may be used in another system. Here, in the present embodiment, another embodiment will be described in a case where the water treatment device 1 to which the present invention is applied is disposed in the other system.

Figure 11:
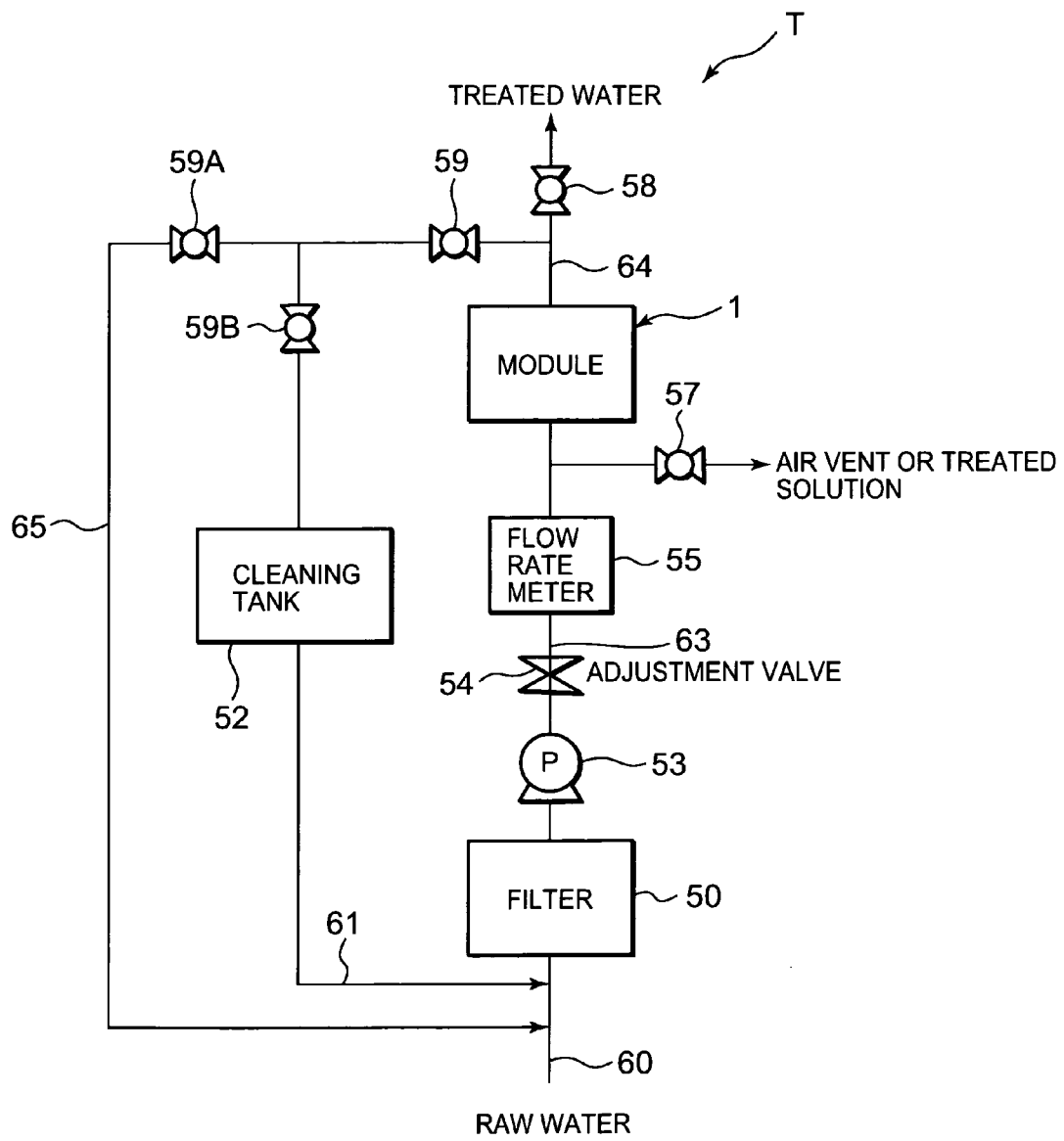
FIG. 11 is a schematic diagram showing a system according to still another embodiment including the water treatment device of the present invention (Embodiment 2).

FIG. 11 is a diagram schematically showing the system of the other embodiment provided with the water treatment device 1 to which the present invention is applied. This system is an apparatus for removing or decomposing microorganisms and fine matters included in for-treatment water such as water (hot water) for use in public bath or hot spring. It is to be noted that in FIG. 11, components denoted with the same reference numerals as those of FIGS. 1 to 10 produce the same or similar effect or function, and the description thereof is omitted here.

An apparatus T according to the present embodiment shown in FIG. 11 is a treatment apparatus in which, for example, the raw water (the for-treatment water) of the hot spring or the like is introduced from a bathtub to the apparatus T via a pipe 60, and coarse matters included in the for-treatment water are removed by a filter device 50. Afterward, the water is treated by the water treatment device (a module) 1 of the present invention, and discharged from the apparatus via a pipe 64.

The filter device 50 is a device for removing the coarse matters included in the raw water (hereinafter referred to as the for-treatment water) of the hot spring or the like. The filter device 50 of the present embodiment includes a filter film (not shown) provided in a water tank, and the water tank is divided into two chambers via this filter film. That is, the for-treatment water which has flowed from one end of the filter device 50 to the one chamber of the filter film in the water tank flows into the other chamber through the filter film. At this time, the coarse matters in the for-treatment water are trapped by the filter film, so that the coarse matters can be removed from the for-treatment water. It is to be noted that the filter device 50 is not limited to the above-mentioned constitution, and may have any constitution as long as micro matters can be removed from the for-treatment water. It is to be noted that the water treatment device 1 has a constitution similar to that of Embodiment 1 described above, and hence the description thereof is omitted here.

Moreover, in FIG. 11, reference numeral 53 is a pump for pumping up the for-treatment water from the filter device 50, and the pump is provided along a pipe 63. Then, reference numeral 54 is an adjustment valve for adjusting the flow rate of the for-treatment water which has been pumped up by the pump 53 to flow through the pipe 63, and 55 is a flow rate meter for detecting the flow rate of the for-treatment water which flows through the pipe 63. Reference numeral 57 is a valve device for extracting air pumped up together with the for-treatment water or discharging the for-treatment water from the filter device 50, and 58 is a valve device for discharging, from the apparatus, the for-treatment water treated by the water treatment device 1. Reference numeral 59 is a valve device for returning, to the pipe 60, the for-treatment water treated by the water treatment device 1 via a circulation circuit 65, or returning a cleaning solution passed through the water treatment device 1 as described later back to a cleaning tank 52 provided along a cleaning circuit 61.

The cleaning tank 52 is a tank for receiving the cleaning solution for cleaning the apparatus T, and the cleaning solution received in this cleaning tank 52 is a solution to which, for example, hypochlorous acid, a rinsing solution, tap water or the like has been added.

In the apparatus T of the present embodiment, it can be selected whether the for-treatment water treated by the water treatment device 1 be discharged from the apparatus or returned to the filter device 50. Furthermore, it is constituted that the whole apparatus T can be cleaned with the cleaning solution received in the cleaning tank 52. That is, when the valve device 58 is opened and the valve device 59 is closed, the for-treatment water treated by the water treatment device 1 is discharged from the apparatus via the pipe 64. On the other hand, when the valve device 59 and a valve device 59A are opened and the valve device 58 and a valve device 59B are closed, the for-treatment water treated by the water treatment device 1 returns to the filter device 50 via the circulation circuit 65. Furthermore, to clean the apparatus T, when the valve devices 59 and 59B are opened and the valve devices 58 and 59A are closed, such circulation is performed that the cleaning solution in the cleaning tank 52 is successively allowed to flow through the 50, the pump 53, the adjustment valve 54, the flow rate meter 55 and the water treatment device 1, and returned again to the cleaning tank 52, whereby the whole apparatus T can be cleaned with the cleaning solution.

A treatment flow in the present apparatus T having the above constitution will briefly be described. First, the for-treatment water of the hot spring or the like flows into the apparatus T of the present embodiment via the pipe 60 connected to the bathtub or the like, and flows into the one chamber of the filter device 50. The for-treatment water which has flowed into the one chamber flows into the other chamber through the filter film. Then, in a process in which the water passes through this filter film, the coarse matters in the for-treatment water are trapped by the filter film. The for-treatment water which has flowed into the other chamber is pumped up from the filter device 50 by the operation of the pump 53, and flows into the water treatment device 1 via the adjustment valve 54 and the flow rate meter 55. It is to be noted that a water treatment operation in the water treatment device 1 is similar to that of Embodiment 1 described above, and hence the description thereof is omitted here.

When the valve device 58 is opened and the valve device 59 is closed, the for-treatment water treated by the water treatment device 1 is discharged from the apparatus via the pipe 64. Moreover, when the valve device 58 is closed and the valve device 59 is opened (at this time, the valve device 59A is opened and the valve device 59B is closed), the water returns again to the filter device 50 via the circulation circuit 65 and the pipe 60, and then repeats the above-mentioned operation.

As described above, in the apparatus T of the present embodiment, the for-treatment water treated by the water treatment device 1 can be returned to the filter device 50 and again treated by the water treatment device 1. Therefore, even in a case where much polluted for-treatment water flows which cannot sufficiently be treated when only once passed in the water treatment device 1, the water can be passed again through the water treatment device 1 and treated.

What is claimed is:

1. A water treatment device comprising:
   a water passing first electrode arranged in a channel of for-treatment water;
   a conductive fiber positioned on the downstream side of this first electrode and electrically connected to the first electrode;
   a water passing second electrode positioned on the downstream side of the conductive fiber and forming a pair with the first electrode;
   an insulating porous spacer interposed between the second electrode and the conductive fiber; and
   supply means for supplying voltages to both of the electrodes, wherein the channel at which the insulating porous spacer is positioned is narrower than the channel at which the conductive fiber is positioned.

2. The water treatment device according to claim 1, further comprising:

a stationary ring attached to an outer periphery of the insulating spacer, thereby making the channel at which the insulating porous spacer is positioned be narrower than the channel at which the conductive fiber is positioned.

3. The water treatment device according to claim 2, wherein the conductive fiber is brought into close contact with the first electrode owing to the pressing force of the spacer.

4. The water treatment device according to claim 3, wherein the center of the first electrode is matched with that of the conductive fiber, and the supply means applies the voltages to the centers of both of the electrodes.

5. The water treatment device according to claim 4, wherein the conductive fiber includes at least one selected from the group consisting of a carbon fiber, an active carbon fiber, a platinum fiber, a titanium fiber, a carbon nano tube, the carbon fiber coated with a catalyst, a resin fiber coated with the catalyst, the active carbon fiber coated with the catalyst, and the titanium fiber coated with the catalyst.

6. The water treatment device according to claim 5, wherein the insulating porous spacer has a void ratio in excess of 95%.

* * * * *